US012768714B2

(12) United States Patent
Kitahara et al.

(10) Patent No.: US 12,768,714 B2
(45) Date of Patent: Oct. 20, 2026

(54) SENSING CIRCUIT AND OPTICAL SENSOR

(71) Applicant: ROHM CO., LTD., Kyoto (JP)

(72) Inventors: Takahiro Kitahara, Kyoto (JP); Satoshi Ono, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 140 days.

(21) Appl. No.: 18/788,328

(22) Filed: Jul. 30, 2024

(65) Prior Publication Data

US 2024/0418568 A1 Dec. 19, 2024

Related U.S. Application Data

(63) Continuation of application No. PCT/JP2022/048562, filed on Dec. 28, 2022.

(30) Foreign Application Priority Data

Feb. 8, 2022 (JP) ................................ 2022-017776

(51) Int. Cl.
*G01J 1/44* (2006.01)

(52) U.S. Cl.
CPC ...................................... *G01J 1/44* (2013.01)

(58) Field of Classification Search
CPC ................ G01J 1/44; G01J 1/42; H10F 39/12
See application file for complete search history.

(56) References Cited

U.S. PATENT DOCUMENTS

2020/0375484 A1* 12/2020 Lin .................... A61B 5/14552
2021/0376850 A1* 12/2021 Mudegowdar ........ H03M 1/001

FOREIGN PATENT DOCUMENTS

JP S615378 A 1/1986
JP 2004144734 A * 5/2004
JP 2013251777 A 12/2013
JP 2021110658 A 8/2021

OTHER PUBLICATIONS

International Search Report for International Application No. PCT/JP2022/048562; Mailed Mar. 28, 2023.
PCT Written Opinion of the International Searching Authority for International Application No. PCT/JP2022/048562; Mailed Mar. 28, 2023.

* cited by examiner

*Primary Examiner* — Monica T Taba
(74) *Attorney, Agent, or Firm* — CANTOR COLBURN LLP

(57) ABSTRACT

For example, a sensing circuit includes: an integrator configured to generate an analog output signal by integrating an analog input signal; an analog/digital converter configured to convert the analog output signal into a digital output signal; and a controller configured to discharge the analog output signal when, during an integration period of the integrator, the digital output signal reaches a first threshold value.

9 Claims, 10 Drawing Sheets

<Prior Art>

<Prior Art>

<Prior Art>

<Prior Art>

<Prior Art>

<Prior Art>

SENSING CIRCUIT AND OPTICAL SENSOR

CROSS-REFERENCE TO RELATED APPLICATIONS

This application is a continuation under 35 U.S.C. § 120 of PCT/JP2022/048562 filed on Dec. 28, 2022, which is incorporated herein by reference, and which claimed priority to Japanese Patent Application No. 2022-017776 filed on Feb. 8, 2022, the entire contents of which is hereby incorporated by reference.

TECHNICAL FIELD

The disclosure herein relates to optical sensors (such as illuminance sensors or proximity sensors for smartphones) and to sensing circuits used in them.

BACKGROUND ART

Optical sensors that sense light are used in a variety of applications.

One example of known technology related to what has just been mentioned is seen in Patent Document 1 identified below.

CITATION LIST

Patent Literature

Patent Document 1: JP-A-2021-110658

DESCRIPTION OF EMBODIMENTS

Optical Sensor (First Comparative Example)

Figure 1:
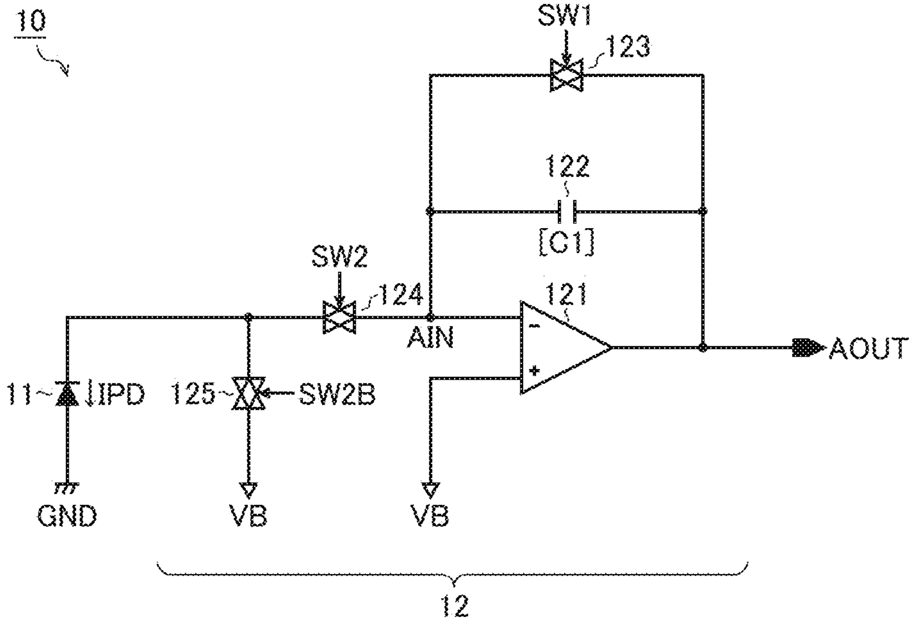
FIG. 1 is a diagram showing an optical sensor of a first comparative example.

First, prior to a description of an optical sensor according to a novel embodiment, some comparative examples for comparison with it will be described in brief. FIG. 1 is a diagram showing an optical sensor of a first comparative example. The optical sensor 10 of this comparative example is a semiconductor integrated circuit device (such as an illuminance sensor IC) that senses light and converts it into an electrical signal and includes a light-sensing element 11 and a sensing circuit 12.

The light-sensing element 11 is a photoelectric conversion element that generates a light-sense signal IPD (a current signal) corresponding to the incident light. The light-sense signal IPD increases with increasing intensity of the incident light and decreases with decreasing intensity of the incident light. Suitably used as the light-sensing element 11 is a photodiode or a phototransistor.

The sensing circuit 12 is a circuit block that senses the light-sense signal IPD to generate an analog output signal AOUT, and includes an operational amplifier 121, a capacitor 122, and switches 123 to 125.

The inverting input terminal (−) of the operational amplifier 121 is connected to an application terminal for an analog input signal AIN. The non-inverting input terminal (+) of the operational amplifier 121 is connected to an application terminal for a bias voltage VB (e.g., VB=0.5 V). The output terminal of the operational amplifier 121 is connected to an application terminal for the analog output signal AOUT. The analog output signal AOUT is subjected, in an unillustrated circuit in a subsequent stage, to amplification, A/D (analog-to-digital) conversion, and the like.

The capacitor 122 (with a capacitance value C1) is connected between the inverting input terminal (−) and the output terminal of the operational amplifier 121.

The switch 123 is connected in parallel with the capacitor 122 and is turned on and off according to a switch signal SW1. For example, the switch 123 is on when SW1=H, and is off when SW1=L.

The switch 124 is connected between the light-sensing element 11 (e.g., the cathode of a photodiode) and the inverting input terminal (−) of the operational amplifier 121, and is turned on and off according to a switch signal SW2. For example, the switch 124 is on when SW2=H, and is off when SW2=L.

The switch 125 is connected between the light-sensing element 11 (e.g., the cathode of a photodiode) and the application terminal for the bias voltage VB, and is turned on and off according to an inverted switch signal SW2B (which is a logically inverted signal of the switch signal SW2). For example, the switch 125 is on when SW2B=H, and is off when SW2B=L.

Figure 2:
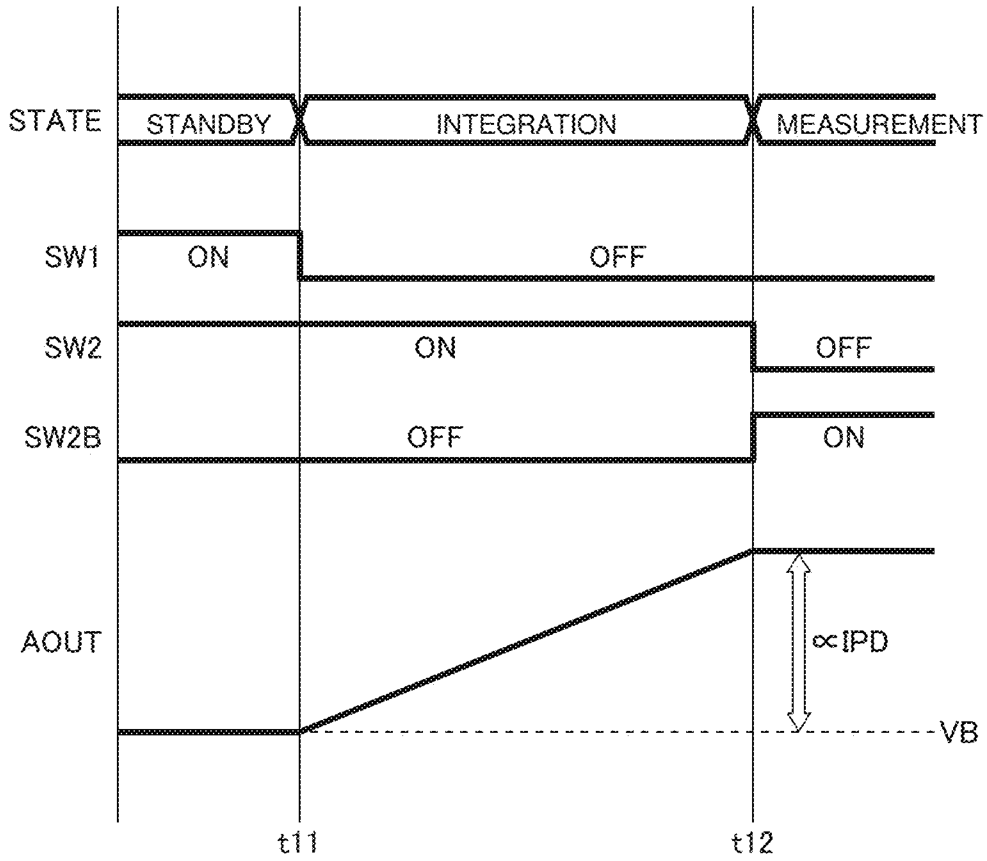
FIG. 2 is a diagram showing one example of light-sensing operation in the first comparative example.

FIG. 2 is a diagram showing one example of light-sensing operation in the first comparative example, depicting, from top down, the operating state (STATE) of the optical sensor 10, the switch signals SW1 and SW2, the inverted switch signal SW2B, and the analog output signal AOUT.

Before time t11, the optical sensor 10 is in a standby period. In this period, SW1=SW2=H and SW2B=L. That is, the switches 123 and 124 are on and the switch 125 is off. As a result, the sensing circuit 12 does not integrate the light-sense signal IPD (hence the analog input signal AIN), and thus AOUT=VB.

Between times t11 and t12, the optical sensor 10 is in an integration period. In this period, SW1=SW2B=L and SW2=H. That is, the switches 123 and 125 are off and the switch 124 is on. As a result, the sensing circuit 12 integrates the light-sense signal IPD (hence the analog input signal AIN), and thus the analog output signal AOUT increases starting at the bias voltage VB.

After time t12, the optical sensor 10 is in a measurement period. In this period, SW1=SW2=L and SW2B=H. That is, the switches 123 and 124 are off and the switch 125 is on. As a result, the analog output signal AOUT is held at its signal value immediately before time t12. This analog output signal AOUT has a voltage value corresponding to the magnitude of the light-sense signal IPD (hence the intensity of the incident light) and is used as the measured value of the incident light.

One of the most important attributes of the optical sensor 10 is its sensitivity. One way to increase the sensitivity is to increase the analog output signal AOUT yielded for a given intensity of incident light, and this is achieved by increasing the integration period (between times t11 and t12).

It should however be noted that the analog output signal AOUT has an upper-limit value (output dynamic range) that depends on the supply voltage and the circuit type of the optical sensor 10 and, if the analog output signal AOUT reaches the upper-limit value, integration cannot be performed properly.

For example, if the supply voltage of the optical sensor 10 is 3 V, whatever circuit configuration the sensing circuit 12 may have, it is impossible to obtain an analog output signal AOUT of 3 V or more. It is also necessary to secure a sufficient voltage margin to prevent saturation of a transistor in the output stage of the operational amplifier 121. Thus, in practice, a voltage (e.g., 2.8 V) lower than 3 V is the upper-limit value of the analog output signal AOUT.

A description will now be given of a second comparative example with a circuit configuration designed ingeniously to prevent the analog output signal AOUT from reaching the upper-limit value.

Optical Sensor (Second Comparative Example)

Figure 3:
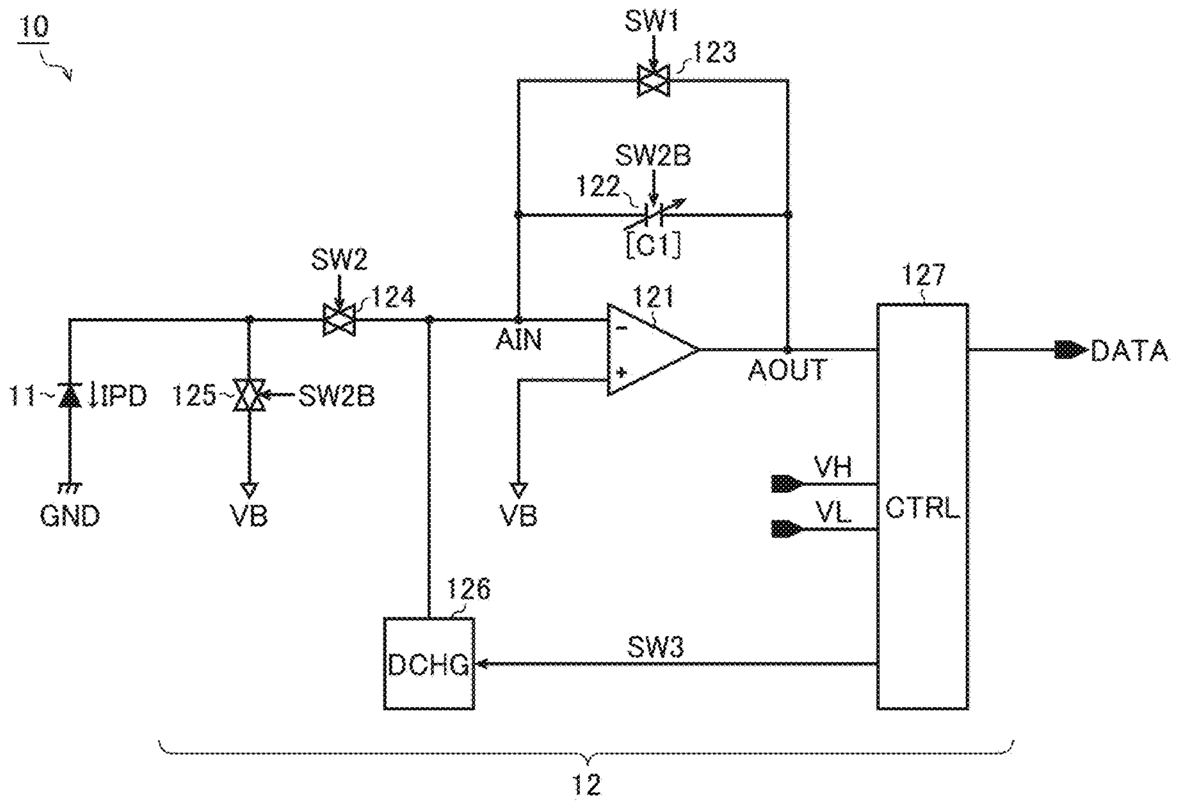
FIG. 3 is a diagram showing an optical sensor of a second comparative example.

FIG. 3 is a diagram showing an optical sensor of a second comparative example. The optical sensor 10 of this comparative example is based on the first comparative example (FIG. 1) and further includes, as components of the sensing circuit 12, a discharger 126 and a controller 127.

The discharger 126 is connected to the inverting input terminal (−) of the operational amplifier 121 and, according to a switch signal SW3 fed from the controller 127, discharges the electric charge stored in the capacitor 122. Specifically, for example, the discharger 126 discharges the capacitor 122 when SW3=H, and suspends the discharging of the capacitor 122 when SW3=L.

The controller 127 generates the switch signal SW3 for controlling the discharger 126 by comparing the analog output signal AOUT with each of an upper-limit value VH and a lower-limit value VL (where VL<VB<VH). The controller 127 also has a function of generating integral value data DATA of the light-sense signal IPD based on the number of times that the capacitor 122 is discharged (i.e., the number of times that the switch signal SW3 is raised to high level).

The capacitance value C1 of the capacitor 122 is not fixed but variable according to an inverted switch signal S2B. More specifically, when S2B=L, C1=C1*a* and, when S2B=H, C1=C1*b*(=m×C1*a*, where m>1) (e.g., m=32, C1*a*=0.5 pF, and C1*b*=16 pF).

With the optical sensor 10 of this comparative example, as the intensity of the incident light increases, the frequency of the discharging of the capacitor 122 increases. Accordingly, incrementing the integral value data DATA each time the capacitor 122 is discharged makes it possible to measure the incident light properly while keeping the analog output signal AOUT within the output dynamic range.

Figure 4:
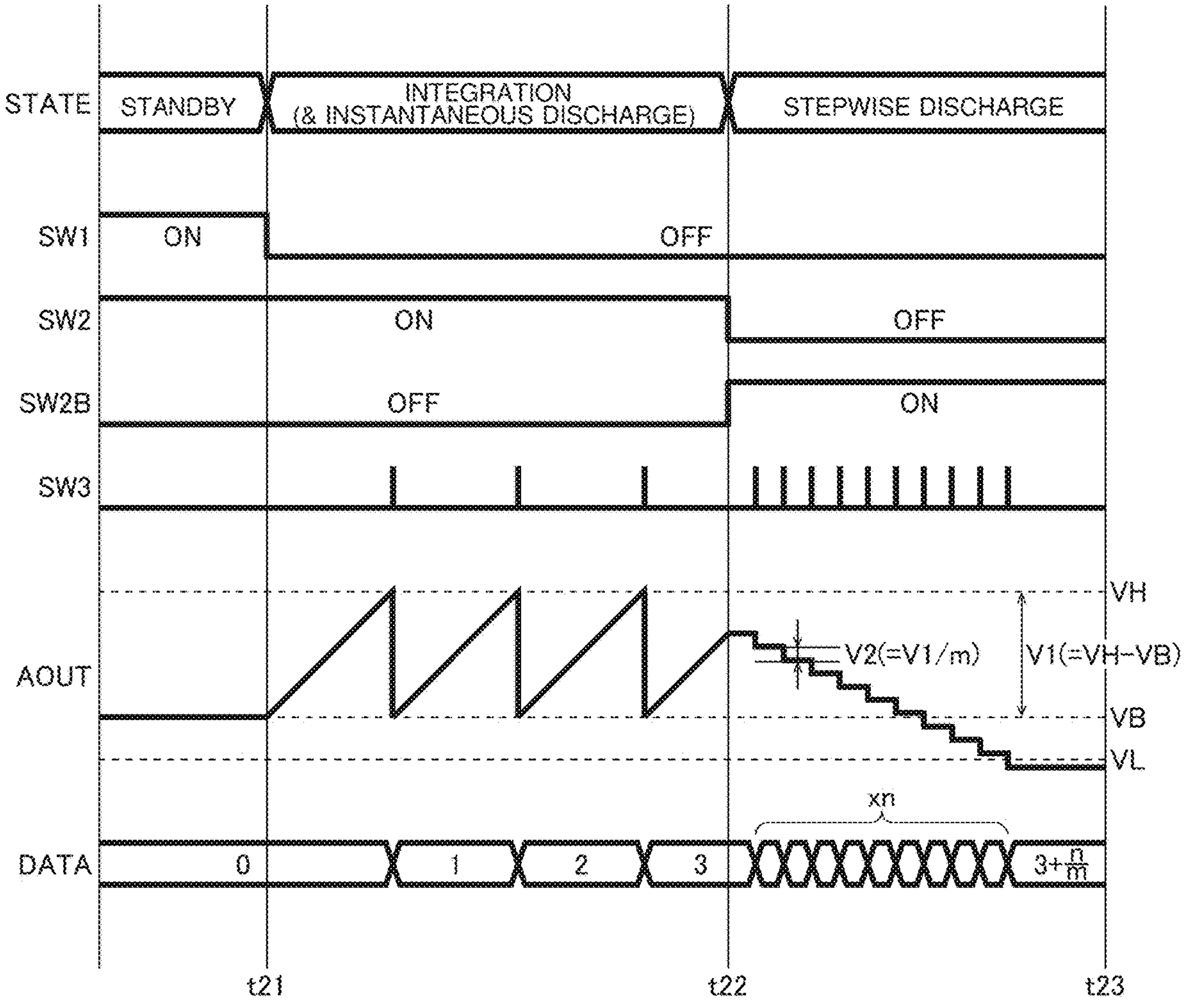
FIG. 4 is a diagram showing one example of light-sensing operation in the second comparative example.

FIG. 4 is a diagram showing one example of light-sensing operation in the second comparative example, depicting, from top down, the operating state (STATE) of the optical sensor 10, the switch signals SW1 and SW2, the inverted switch signal SW2B, the switch signal SW3, the analog output signal AOUT, and the integral value data DATA.

Before time t21, the optical sensor 10 is in a standby period. In this period, SW1=SW2=H and SW2B=L. That is, the switches 123 and 124 are on and the switch 125 is off. As a result, the sensing circuit 12 does not integrate the light-sense signal IPD (hence the analog input signal AIN), and thus AOUT=VB.

Note that, in the standby period above, SW3=L throughout and thus the capacitor 122 is not discharged; the integral value data DATA has an initial value (=0).

Between times t21 and t22, the optical sensor 10 is in an integration period. In this period, SW1=SW2B=L and SW2=H. That is, the switches 123 and 125 are off and the switch 124 is on. As a result, the sensing circuit 12 integrates the light-sense signal IPD (hence the analog input signal AIN), and thus the analog output signal AOUT increases starting at the bias voltage VB.

Moreover, in the integration period above, each time the analog output signal AOUT reaches the upper-limit value VH, the switch signal SW3 is raised to high level and instantaneous discharging of the capacitor 122 is performed. As a result, each time instantaneous discharging as mentioned above is performed, the analog output signal AOUT falls from the upper-limit value VH to the bias voltage VB. That is, one instance of instantaneous discharging results in the analog output signal AOUT falling by an amount of discharge V1 (=VH−VB) (e.g., VH=1.1V, VB=0.5V, and V1=0.6V).

Note that, each time instantaneous discharging as mentioned above is performed, the integral value data DATA is incremented by one. In terms of what is shown in the diagram, during the integration period above, instantaneous discharging is performed three times; thus, at time t22, DATA=3.

Between times t22 and t23, the optical sensor 10 is in a stepwise discharge period. In this period, SW1=SW2=L and SW2B=H. That is, the switches 123 and 124 are off and the switch 125 is on.

Moreover, in the stepwise discharge period above, the capacitance value C1 of the capacitor 122 is switched from the capacitance value C1*a* (e.g., 0.5 pF) in the integration period to a higher capacitance value C1*b* (e.g., 16 pF) and stepwise discharging of the capacitor 122 is performed repeatedly. As a result, each time stepwise discharging as mentioned above is performed, the analog output signal AOUT falls by an amount of discharge V2 (=V1/m) smaller than the previously-mentioned amount of discharge V1 (e.g., m=32, V1=0.6 V, and V2=18.8 mV). Stepwise discharging like this is continued until the analog output signal AOUT falls below the lower-limit value VL at time t23.

Note that, each time stepwise discharging as mentioned above is performed, the integral value data DATA is incremented by 1/m. In terms of what is shown in the diagram, during the stepwise discharge period above, stepwise discharging is performed n times, and thus, at time t23, DATA=3+(n/m). In this way, with stepwise discharging as mentioned above, the integral value data DATA can be measured to digits below the decimal point, and this makes it possible to enhance the resolution of the integral value data DATA.

As a result, with the optical sensor 10 of this comparative example, the quotient resulting from dividing the "voltage proportional to the intensity of the light-sense signal IPD (hence the incident light)" by the amount of discharge V2 (e.g., 18.8 mV) is obtained as the integral value data DATA.

With this method, increasing the integration period results in raising the sensitivity of the optical sensor 10. In practice, however, due to application-specific restrictions and the like, the integration period cannot be increased without limit. For example, in proximity sensors or the like for smartphones, integration has to be completed in about 10 to 100 μs.

Figure 5:
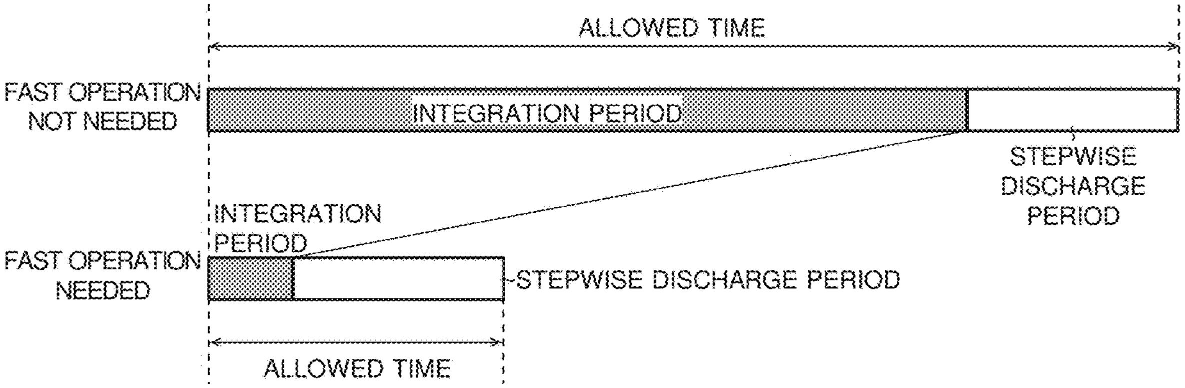
FIG. 5 is a diagram showing how a stepwise discharge period can be a bottleneck.

FIG. 5 is a diagram showing how the stepwise discharge period can be a bottleneck. Employing the light-sensing operation of the second comparative example necessitates, in addition to the integration period, the stepwise discharge period, which lasts for a given length of time. As shown in an upper part of the diagram, in an application that allows a sufficient integration period (for example, an application that does not require fast response), the stepwise discharge period has a low ratio to the integration period and thus it is unlikely to influence the sensitivity of the optical sensor 10.

By contrast, as shown in a lower part of the diagram, in an application that requires fast response as in flickering operation, the stepwise discharge period turns out to be a bottleneck; this makes it impossible to secure a sufficient integration period and leads to lower sensitivity. On the other hand, giving priority to securing an integration period (maintaining sensitivity) leads to limiting the response speed.

Figure 6:
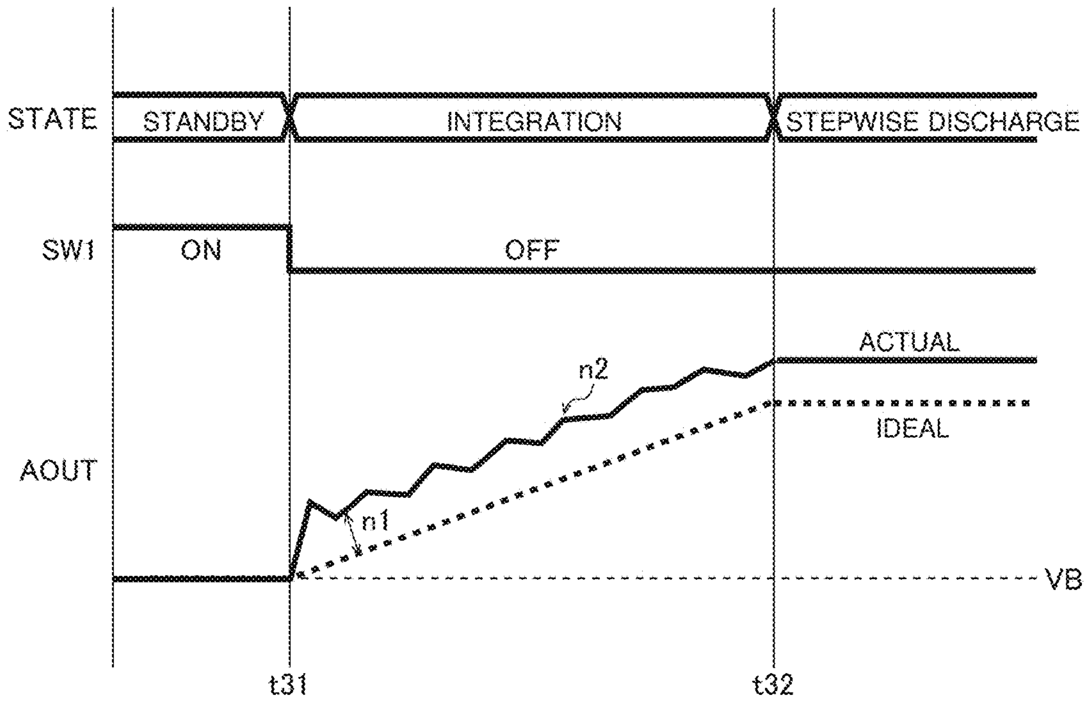
FIG. 6 is a diagram showing an actual and an ideal waveform of an analog output signal.

FIG. 6 is a diagram showing an actual waveform and an ideal waveform of the analog output signal AOUT, depicting, from top down, the operating state STATE of the optical sensor 10, the switch signal SW1, and the analog output signal AOUT. For the analog output signal AOUT, a solid line indicates actual behavior, and a broken line indicates ideal behavior.

The analog output signal AOUT contains noise composed of two noise components n1 and n2.

The first noise component n1 stems from voltage variation that occurs the moment that integration is started at time t31, that is, the moment that the switch signal SW1 is switched from high level to low level (hence the moment that the switch 123 is switched from on to off).

The second noise component n2 stems from voltage variation that occurs during integration of the analog output signal AOUT by the operational amplifier 121 gained up in the ratio of the parasitic capacitance (with a capacitance value Cp) of the light-sensing element 11 to the integral capacitance (i.e., the capacitance value C1 of the capacitor 122).

The stepwise discharging described above is performed on the basis of the voltage value of the analog output signal AOUT at the time that integration ends at time t32. Accordingly, to improve the SN ratio of the optical sensor 10, it is essential to reduce the influence of the two noise components n1 and n2 mentioned above.

In view of the above studies, a description will now be given of a novel embodiment that achieves fast operation combined with an improved SN ratio.

Optical Sensor (Embodiment)

Figure 7:
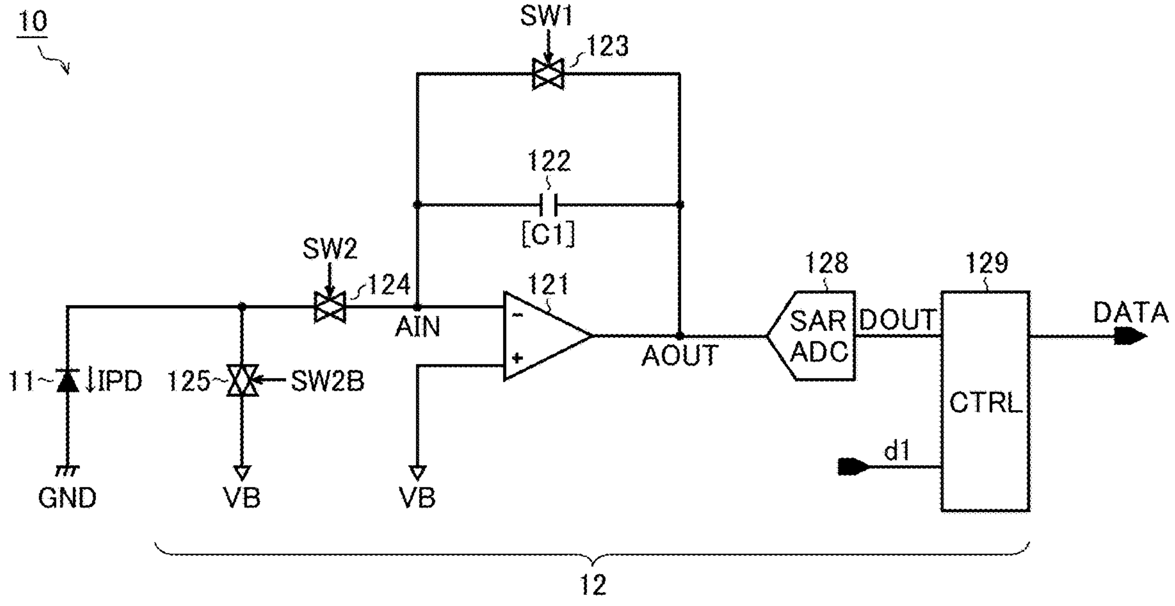
FIG. 7 is a diagram showing an optical sensor according to a novel embodiment.

FIG. 7 is a diagram showing an optical sensor according to a novel embodiment. The optical sensor 10 of this embodiment is based on the first comparative example (FIG. 1) described previously and further includes, as components of the sensing circuit 12, an analog/digital converter 128 and a controller 129.

The components already described, namely the operational amplifier 121, the capacitor 122, and the switches 123 to 125, constitute an integrator that generates the analog output signal AOUT by integrating the analog input signal AIN.

The analog/digital converter 128 converts the analog output signal AOUT into a digital output signal DOUT. The analog/digital converter 128 can be, for example, of a successive-approximation-register type (what is called an SAR type).

The controller 129 controls the switch 123 (corresponding to a discharge switch) so as to discharge the analog output signal AOUT when, during the integration period of the above-mentioned integrator, the digital output signal DOUT reaches a signal level d1 (corresponding to a first threshold value). The controller 129 also generates the integral value data DATA by adding up the signal value of the digital output signal DOUT immediately before the discharging of the analog output signal AOUT and the signal value of the digital output signal DOUT immediately before the end of the integration period (details will be given later).

In comparison with the second comparative example (FIG. 3) described previously, the optical sensor 10 of this embodiment can be understood to have a configuration where, instead of the discharger 126 for stepwise discharging and the controller 127 for comparing the analog output signal AOUT with the upper- and lower-limit values VH and VL, the analog/digital converter 128 is connected in the stage subsequent to the operational amplifier 121.

Figure 8:
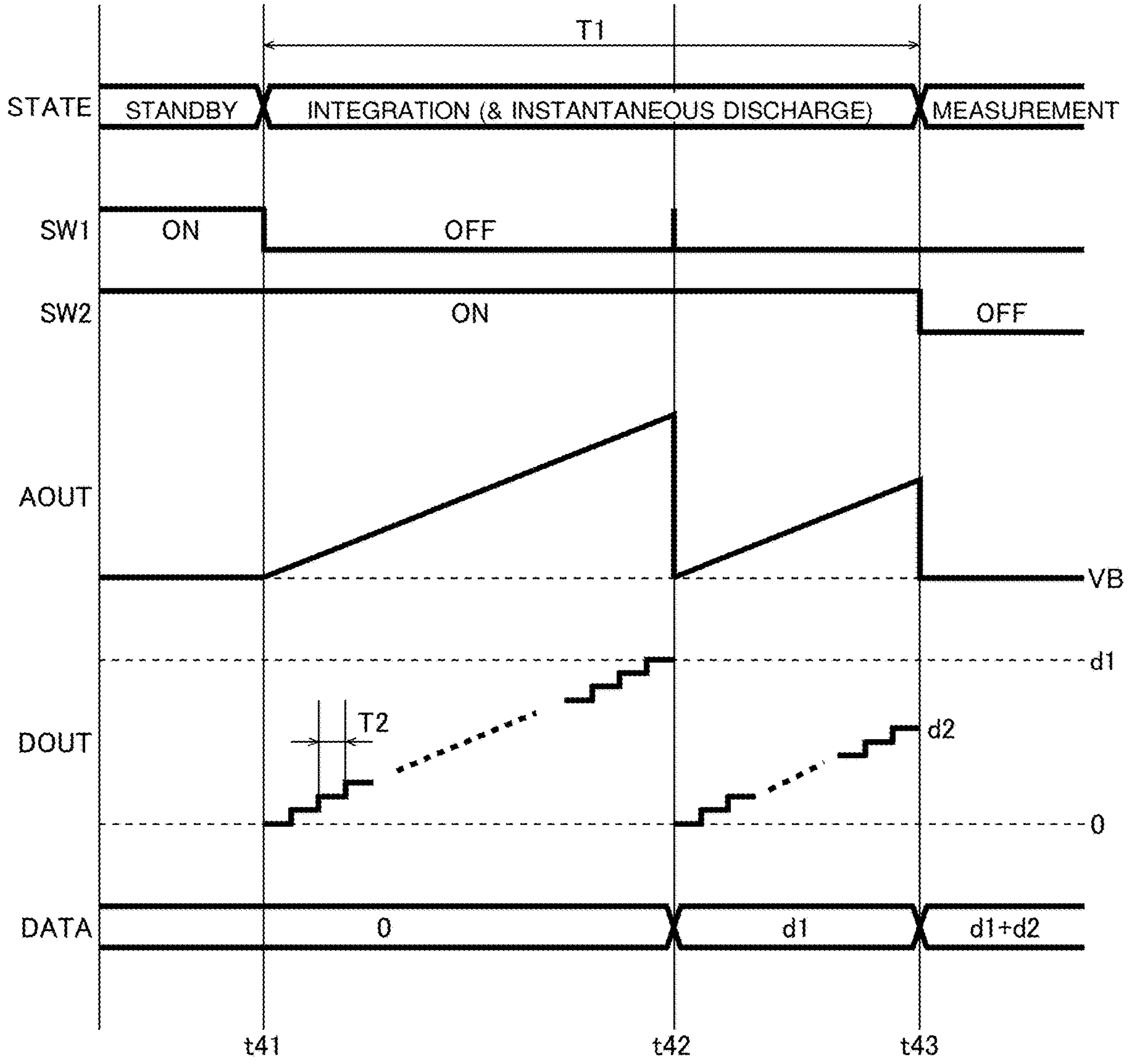
FIG. 8 is a diagram showing a first example of light-sensing operation in the novel embodiment.

FIG. 8 is a diagram showing a first example of light-sensing operation in this embodiment, depicting, from top down, the operating state (STATE) of the optical sensor 10, the switch signals SW1 and SW2, the analog output signal AOUT, the digital output signal DOUT, and the integral value data DATA.

Before time t41, the optical sensor 10 is in a standby period. In this period, SW1=SW2=H and SW2B=L. That is, the switches 123 and 124 are on and the switch 125 is off. As a result, the sensing circuit 12 does not integrate the light-sense signal IPD (hence the analog input signal AIN), and thus AOUT=VB. In this standby period, the digital output signal DOUT and the integral value data DATA both have an initial value (=0).

Between times t41 and t43, the optical sensor 10 is in an integration period (T1, e.g., several tens of microseconds to several milliseconds). In this period, SW1=SW2B=L and SW2=H. That is, the switches 123 and 125 are off and the switch 124 is on. As a result, the sensing circuit 12 integrates the light-sense signal IPD (hence the analog input signal AIN), and thus the analog output signal AOUT increases starting at the bias voltage VB.

Moreover, the analog/digital converter 128 generates the digital output signal DOUT by performing A/D conversion on the analog output signal AOUT with a predetermined sampling period (T2, e.g., several microseconds). Accordingly, after time t41, as the analog output signal AOUT rises, the signal value of the digital output signal DOUT increases.

As shown at time t42, during the integration period mentioned above, each time the digital output signal DOUT reaches a signal value d1, the switch signal SW1 is raised to high level and instantaneous discharging of the capacitor 122 is performed. As a result, each time instantaneous discharging as mentioned above is performed, the analog output signal AOUT falls from the upper-limit value to the bias voltage VB. The instantaneous discharging of the analog output signal AOUT causes the digital output signal DOUT to be reset from the signal value d1 to the initial value 0. Moreover, the integral value data DATA is overwritten with the signal value d1 of the digital output signal DOUT immediately before the discharging of the analog output signal AOUT.

After the instantaneous discharging of the capacitor 122, when the switch signal SW1 is dropped back to low level, integration of the light-sense signal IPD (hence the analog input signal AIN) is restarted, and thus the analog output signal AOUT rises starting at the bias voltage VB; together, also the signal value of the digital output signal DOUT increases.

When at time t43 the integration period mentioned above ends, SW1=SW2=L and SW2B=H. That is, the switches 123 and 124 are off and the switch 125 is on. The controller 129 generates the integral value data (=d1+d2) by adding up the signal value of the digital output signal DOUT immediately before the discharging of the analog output signal AOUT (in the diagram, the signal value d1 at time t42) and the signal value of the digital output signal DOUT immediately before the end of the integration period (in the diagram, the signal value d2 at time t43).

Thus, with the optical sensor 10 of this embodiment, unlike the second comparative example (FIG. 3) described previously, it is possible to fix the integral value data only with the integration period, that is, without the need for the stepwise discharge period. It is thus possible to secure a longer integration period even in an application that requires fast response, and thus to raise sensitivity.

Figure 9:
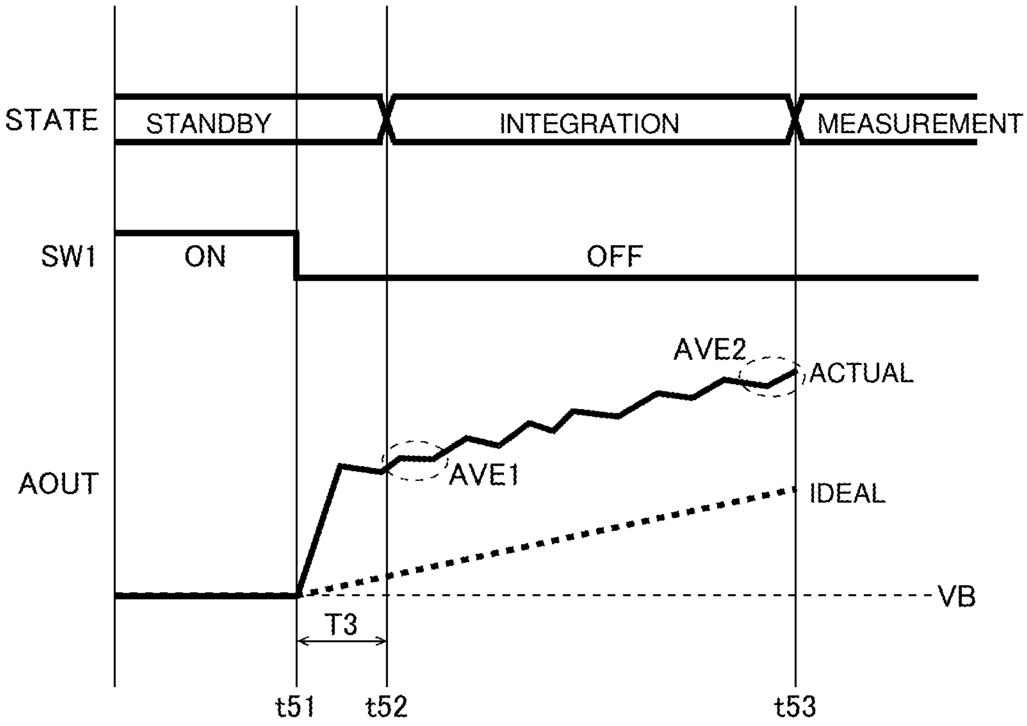
FIG. 9 is a diagram showing a second example of light-sensing operation in the novel embodiment.

FIG. 9 is a diagram showing a second example of light-sensing operation in this embodiment, depicting, from top down, the operating state (STATE) of the optical sensor 10, the switch signal SW1, and the analog output signal AOUT.

As indicated between times t51 and t52, the controller 129, at the transition from the standby period to the integration period, turns off the switch 123 and then, at the lapse of a predetermined time T3 after that, performs A/D conversion on the analog output signal AOUT for a number of sampling times m (e.g., m=64), thereby to calculate a first average value AVE1 of the digital output signal DOUT.

The predetermined time T3 can be set to a length of time enough for the voltage variation (corresponding to the first noise component n1 in FIG. 6) occurring the moment that the switch 123 is switched from on to off to settle into equilibrium.

On the other hand, the number of sampling times m can be set to a number enough to smooth out the voltage variation (corresponding to the second noise component n2 in FIG. 6) occurring during integration of the analog output signal AOUT.

After time t52, the controller 129 monitors the analog output signal AOUT (hence the digital output signal DOUT) regularly and continues integrating the analog output signal AOUT either until the digital output signal DOUT reaches the signal value d1 or until the integration period ends at time t53. Though not specifically shown in the diagram, if the digital output signal DOUT reaches the signal value d1 in the middle of the integration period, the analog output signal AOUT is discharged and then its integration is restarted.

Here, the controller 129 calculates a second average value AVE2 of the digital output signal DOUT immediately before the end of the integration period, and takes the difference value (=AVE2−AVE1) obtained by subtracting the first average value AVE1 from the second average value AVE2 as the signal value of the digital output signal DOUT immediately before the end of the integration period.

Here, the number of sampling times for the second average value AVE2 can be a value corresponding to the number of sampling times m for the first average value AVE1 (e.g., a value equal to the number of sampling times m for the first average value AVE1).

Though not specifically shown in the diagram, when discharging the analog output signal AOUT in the middle of the integration period, the controller 129 calculates the second average value AVE2 of the digital output signal DOUT immediately before the discharging of the analog output signal AOUT and takes the difference value (=AVE2−AVE1) obtained by subtracting the previously-mentioned first average value AVE1 from the second average value AVE2 as the signal value of the digital output signal DOUT immediately before the discharging of the analog output signal AOUT.

Signal processing as described above helps reduce the influence of the noise components n1 and n2 in FIG. 6, and it is thus possible to improve the SN ratio of the optical sensor 10.

Figure 10:
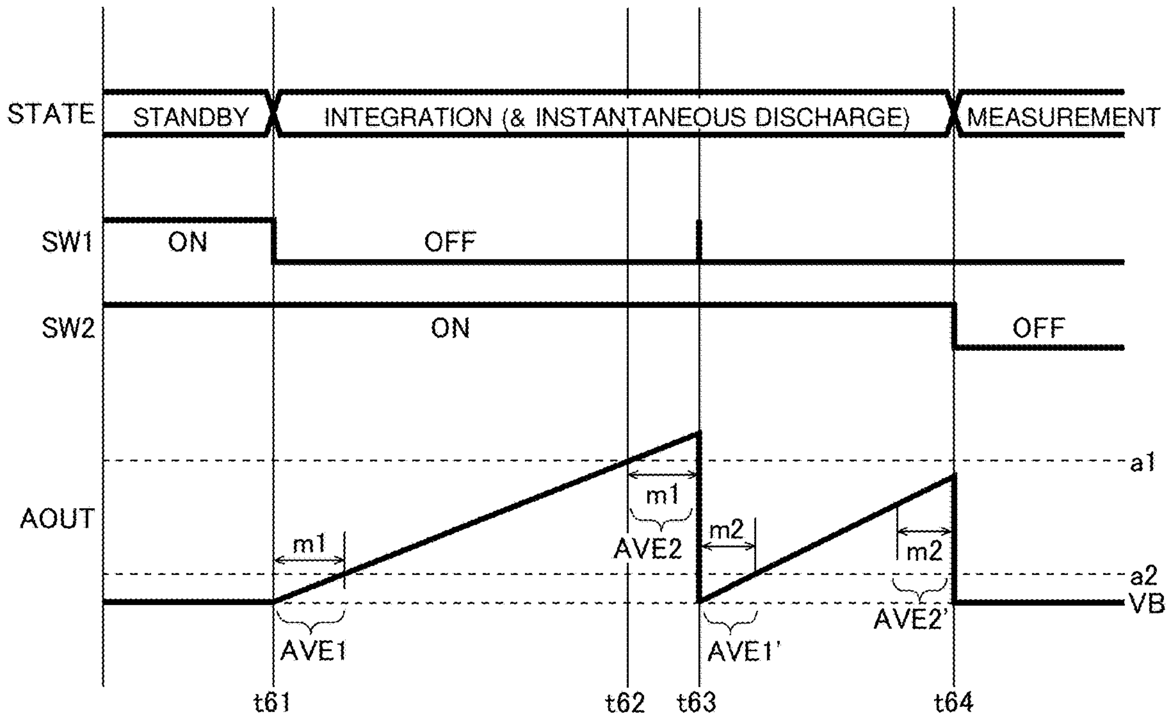
FIG. 10 is a diagram showing a third example of light-sensing operation in the novel embodiment.

FIG. 10 is a diagram showing a third example of light-sensing operation in this embodiment, depicting, from top down, the operating state (STATE) of the optical sensor 10, the switch signals SW1 and SW2, and the analog output signal AOUT (which can be understood as the digital output signal DOUT).

The gradient of the analog output signal AOUT in the integration period varies with the intensity of the analog input signal AIN (hence the intensity of the incident light). Thus, the timing of the discharging of the capacitor 122 during the integration period is not fixed.

Accordingly, in the averaging of the digital output signal DOUT described above, if the number of sampling times m for each of the first and second average values AVE1 and AVE2 is a fixed number, when the intensity of the incident light is high (i.e., when the gradient of the analog output signal AOUT is steep), the digital output signal DOUT may reach the signal value d1 (the first threshold value for discharge control) before the completion of sampling, leading to disrupted operation.

To avoid that, the above-mentioned number of sampling times for the first average value AVE1 (hence the number of sampling times for the second average value AVE2) can be a variable number that varies with the intensity of the analog input signal AIN. Specifically, it is preferable that the number of sampling times for the first average value AVE1 be set dynamically so as to decrease as the analog input signal AIN increases and increase as the analog input signal AIN decreases.

In terms of what is shown in the diagram, the first average value AVE1 of the digital output signal DOUT at the start of the integration period is calculated from the digital output signal DOUT corresponding to the number of sampling times m1 obtained after the switch 123 is turned off at time the 61 until the analog output signal AOUT reaches a signal value a2.

That is, the number of sampling times m1 for the first average value AVE1 is set to the number of sampling times at the time that the analog output signal AOUT reaches the signal value a2 (corresponding a second threshold value for setting a number of sampling times). Accordingly, the number of sampling times m1 decreases as the gradient of the analog output signal AOUT is steeper and increases as the gradient of the analog output signal AOUT is gentler.

When at time t62 the analog output signal AOUT reaches the signal value a1 (corresponding to the first threshold value for discharge control), A/D conversion is performed on the analog output signal AOUT for the above-mentioned number of sampling times m1 to calculate the second average value AVE2 of the digital output signal DOUT.

Then the difference value (=AVE2−AVE1) obtained by subtracting the first average value AVE1 from the second average value AVE2 is taken as the signal value of the digital output signal DOUT immediately before the discharging of the analog output signal AOUT.

When the second average value AVE2 of the digital output signal DOUT is calculated, at time t63 the switch 123 is turned on momentarily to discharge the analog output signal AOUT until it becomes equal to the bias voltage VB.

After the above discharging, the first average value AVE1' of the digital output signal DOUT at the restart of integration is calculated from the digital output signal DOUT corresponding to a number of sampling times m2 obtained after the switch 123 is turned back off at time t63 until the analog output signal AOUT reaches the signal value a2.

That is, the number of sampling times m2 for the first average value AVE1' is set to the number of sampling times at the time that the analog output signal AOUT reaches the signal value a2. In the diagram, the gradient of the analog output signal AOUT is steeper between times t63 and t64 than between times t61 and t63. Accordingly, the number of sampling times m2 is smaller than the number of sampling times m1.

After that, immediately before the end of the integration period at time 64, A/D conversion is performed on the analog output signal AOUT for the above-mentioned number of sampling times m2 to calculate the second average value AVE2' of the digital output signal DOUT.

Then the difference value (=AVE2'−AVE1') obtained by subtracting the first average value AVE1' from the second average value AVE2' is taken as the signal value of the digital output signal DOUT immediately before the end of the integration period.

Overview

To follow is an overview of the various embodiments described herein.

For example, according to one aspect of what is disclosed herein, a sensing circuit includes: an integrator configured to generate an analog output signal by integrating an analog input signal; an analog/digital converter configured to convert the analog output signal into a digital output signal; and a controller configured to discharge the analog output signal when, during an integration period of the integrator, the digital output signal reaches a first threshold value. (A first configuration.)

In the sensing circuit of the first configuration described above, the controller can generates integral value data by adding up the signal value of the digital output signal immediately before the discharging of the analog output signal and the signal value of the digital output signal immediately before the end of the integration period. (A second configuration.)

In the sensing circuit of the first or second configuration described above, the integrator can include: an operational amplifier configured to have an inverting input terminal connected to an application terminal for the analog input signal, a non-inverting input terminal connected to an application terminal for a bias voltage, and an output terminal connected to an application terminal for the analog output signal; an integral capacitance configured to be connected between the inverting input terminal and the output terminal of the operational amplifier; and a discharge switch configured to be connected in parallel with the integral capacitance. (A third configuration.)

In the sensing circuit of the third configuration described above, the controller can calculate a first average value of the digital output signal at the lapse of a predetermined time after turning off the discharge switch and calculate a second average value of the digital output signal immediately before the discharging of the analog output signal or immediately before the end of the integration period. The controller can take the difference value obtained by subtracting the first average value from the second average value as the signal value of the digital output signal immediately before the discharging of the analog output signal or immediately before the end of the integration period. (A fourth configuration.)

In the sensing circuit of the fourth configuration described above, the number of sampling times for the second average value can be set according to the number of sampling times for the first average value. (A fifth configuration.)

In the sensing circuit of the fifth configuration described above, the number of sampling times for the first average value can be a variable number that varies with the intensity of the analog input signal. (A sixth configuration.)

In the sensing circuit of the sixth configuration described above, the number of sampling times for the first average value can decrease as the analog input signal increases and increase as the analog input signal decreases. (A seventh configuration.)

In the sensing circuit of the seventh configuration described above, the number of sampling times for the first average value can be set to the number of sampling times at the time that the analog output signal reaches a second threshold value. (An eighth configuration.)

In the sensing circuit of any of the first to eighth configurations described above, the analog/digital converter can be of a successive-approximation-register type. (A ninth configuration.)

For another example, according to another aspect of what is disclosed herein, a optical sensor includes: a light-sensing element configured to generate a light sense signal; and the sensing circuit of any of the first to ninth configurations described above, configured to receive the light sense signal as the analog input signal. (A tenth configuration.)

According to the disclosure herein, it is possible to provide an optical sensor that achieves fast operation combined with an improved SN ratio, and to provide a sensing circuit for use in it.

Further Modifications

The various technical features disclosed herein may be implemented in any manners other than as in the embodiments described above and allow for many modifications without departure from the spirit of their technical ingenuity. That is, the embodiments described above should be understood to be in every aspect illustrative and not restrictive, and the technical scope of the present disclosure is defined by the appended claims and should be understood to encompass any modifications within a scope and sense equivalent to those claims.

The invention claimed is:

1. A sensing circuit comprising:

an integrator configured to generate an analog output signal by integrating an analog input signal;

an analog/digital converter configured to convert the analog output signal into a digital output signal; and a controller configured to discharge the analog output signal when, during an integration period of the integrator, the digital output signal reaches a first threshold value, wherein the controller generates integral value data by adding up a signal value of the digital output signal immediately before discharging of the analog output signal and a signal value of the digital output signal immediately before an end of the integration period.

2. The sensing circuit according to claim 1, wherein the integrator includes:

an operational amplifier configured to have an inverting input terminal connected to an application terminal for the analog input signal, a non-inverting input terminal connected to an application terminal for a bias voltage, and an output terminal connected to an application terminal for the analog output signal;

an integral capacitance configured to be connected between the inverting input terminal and the output terminal of the operational amplifier; and a discharge switch configured to be connected in parallel with the integral capacitance.

3. The sensing circuit according to claim 1, wherein the analog/digital converter is of a successive-approximation-register type.

4. An optical sensor comprising:

a light-sensing element configured to generate a light sense signal; and the sensing circuit according to claim 1, configured to receive the light sense signal as the analog input signal.

5. A sensing circuit comprising:

an integrator configured to generate an analog output signal by integrating an analog input signal;

an analog/digital converter configured to convert the analog output signal into a digital output signal; and a controller configured to discharge the analog output signal when, during an integration period of the integrator, the digital output signal reaches a first threshold value, wherein the integrator includes:

an operational amplifier configured to have an inverting input terminal connected to an application terminal for the analog input signal, a non-inverting input terminal connected to an application terminal for a bias voltage, and an output terminal connected to an application terminal for the analog output signal;

an integral capacitance configured to be connected between the inverting input terminal and the output terminal of the operational amplifier; and a discharge switch configured to be connected in parallel with the integral capacitance, wherein the controller calculates a first average value of the digital output signal at a lapse of a predetermined time after turning off the discharge switch and calculates a second average value of the digital output signal immediately before discharging of the analog output signal or immediately before an end of the integration period, the controller taking a difference value obtained by subtracting the first average value from the second average value as a signal value of the digital output signal immediately before the discharging of the analog output signal or immediately before the end of the integration period.

6. The sensing circuit according to claim 5, wherein a number of sampling times for the second average value is set according to a number of sampling times for the first average value.

7. The sensing circuit according to claim 6, wherein the number of sampling times for the first average value is a variable number that varies with intensity of the analog input signal.

8. The sensing circuit according to claim 7, wherein the number of sampling times for the first average value decreases as the analog input signal increases and increases as the analog input signal decreases.

9. The sensing circuit according to claim 8, wherein the number of sampling times for the first average value is set to a number of sampling times at a time that the analog output signal reaches a second threshold value.

* * * * *